July 27, 1937.
A. A. ARVINTZ
2,088,226
COMBINED PLUG AND VALVE DEVICE
Filed July 12, 1935
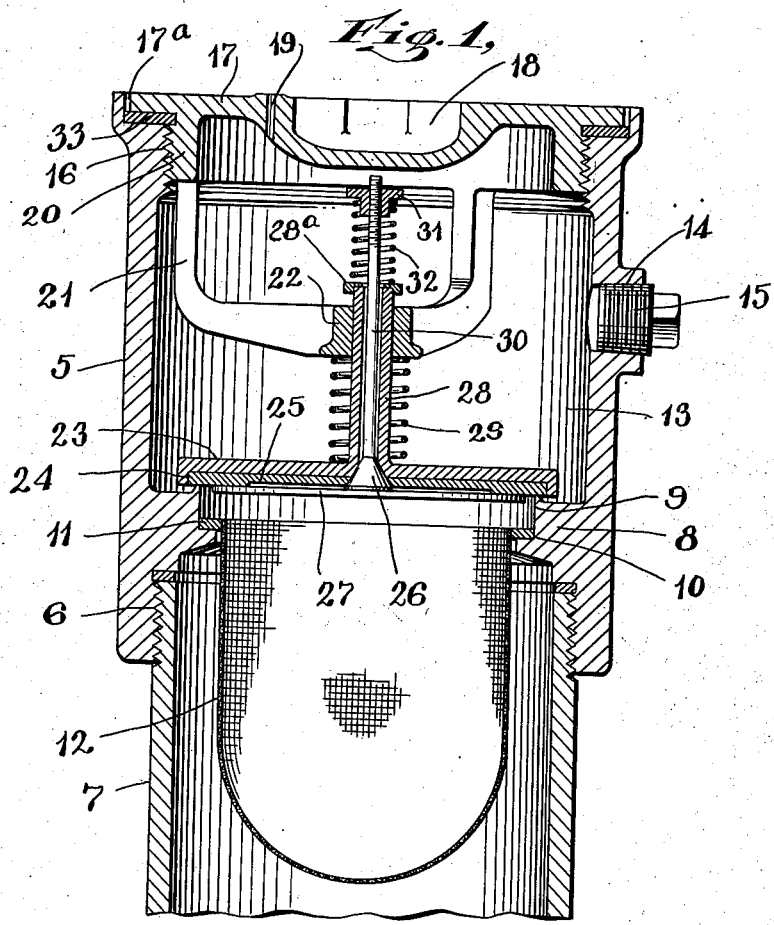
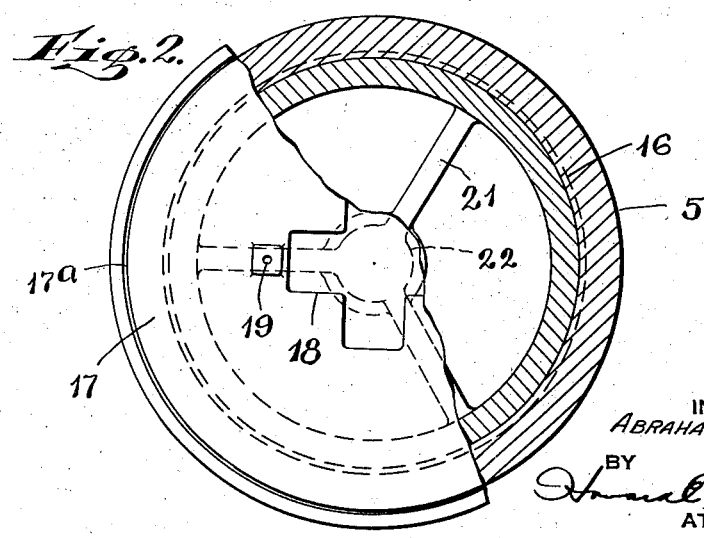
INVENTOR
ABRAHAM A. ARVINTZ
BY
*Howard E. Thompson*
ATTORNEY Patented July 27, 1937

2,088,226

UNITED STATES PATENT OFFICE 2,088,226

COMBINED PLUG AND VALVE DEVICE

Abraham A. Arvintz, Brooklyn, N. Y., assignor to Seal-O-Strain Corporation, Brooklyn, N. Y., a corporation of New York Application July 12, 1935, Serial No. 31,034

11 Claims. (Cl. 277—45)

This invention relates to devices designed particularly for use in connection with vent pipes or filling pipes of gasoline, oil or other tanks, and particularly to a plug device for closing the open end of such a pipe, the plug including automatically actuated valves to compensate for abnormal conditions that may prevail in a storage tank or in the pipe leading therefrom; and the object of the invention is to provide a device of the class described comprising a casing adapted to be coupled with a tube or pipe and including a closure cap or plug detachable with respect to the casing and in connection with which two check or control valves are supported to form a complete closure and control unit; a further object being to provide a control unit consisting of a relatively large valve normally closing the admission passage to said tube and adapted to be automatically opened in the presence of excessive pressure within the tube, said valve also including a check valve automatically actuated in the presence of an excessive vacuum created in the tube or tank in relieving such vacuum; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal sectional view through a plug and valve device made according to my invention; and, Fig. 2 is a plan and sectional view of the device shown in Fig. 1.

For the purpose of illustrating one method of carrying my invention into effect, I have indicated at 5 a substantially tubular casing, one end portion of which is threaded as seen at 6 to be attached to a vent or filling tube or pipe 7 of a storage tank for gas, oil or other substances. The casing 5 forms a part of a complete combination plug and valve which functions as a closure as well as an automatic safety device for the tube or pipe 7 of the tank in connection with which the same is coupled or communicates.

The casing 5 is provided with an inwardly extending annular body 8 having on its upper surface a valve seat 9 below which is a groove 10 in which the ring 11 of a cup-shaped strainer device 12 is adapted to rest. Above the body 8 the casing 5 is provided with a relatively large chamber 13, one wall of which is provided with a threaded aperture 14 with which an overflow drain pipe may be coupled, and which in the construction shown, is closed by a plug 15 for the reason that in most installations, the use of the pipe referred to is not essential.

The upper end of the casing 5 is internally threaded as seen at 16 to receive the closure plate or plug proper 17. The central portion of the closure plate is depressed to form an angular socket portion 18 in which a suitable key may be placed to open and close said plate. The plate 17 is also provided with a small vent aperture 19 preferably opening through the top surface of the plate to avoid the transmission of foreign elements therethrough into the chamber 13. The plate 17 is provided with a depending sleeve portion 20 threaded to engage the threads 16. Extending downwardly from said sleeve portion are three inwardly extending arms 21 which join a central bearing portion 22.

At 23, I have shown a large disk-shaped valve preferably provided with a fibrous facing 24 adapted to engage the seat 9. The central portion of the facing is cut away to form a large recess 25, the central portion of which is apertured to form a seat for a small conical valve 26 having a thin disk head 27 which also seats on the outer portion of the fibrous facing 24. The valve 23 includes a tubular steam portion 28 slidably mounted in the bearing 22. A spring 29 encircling the steam between the bearing 22 and valve 23 serves to normally support said valve in seated position. The valve 26 includes a stem 30 which extends upwardly through the tube 28, being considerably smaller than the diameter of the bore of said tube. The stem 30 projects beyond the tube 28 and is provided on its free end portion with an adjustable nut 31 for regulating the tension of a spring disposed between the nut and the upper end of said sleeve 28. With this construction, the opening of the valve 26 including its disk head 27 may be controlled and regulated to suit predetermined conditions existing in the pipe 7 and to provide for the automatic opening of the valve 26 when a predetermined vacuum has been reached in said pipe 7.

A packing ring 33 is disposed between the flange 17a of the closure plate and the upper end of the casing to provide a seal between the parts. However, it will appear that in the event that the operator is careless in moving the plug or closure plate 17 into closed position, the spring 29 will serve to affect a seal between the chamber 13 and the bore or passage of the pipe 7, as will be apparent. It is preferred that this result will be accomplished even though the plug or closure plate 17 is in only a partially closed position. It will also appear that the enlarged head 28a of the sleeve 28 will support the valve 23 against displacement from the machine, the frame 21 or the bearing 22 thereof.

In the use of my improved device, when it is desired to pass a suitable fluid or substance into and through the pipe 7, the plug or closure plate 17 is detached from the casing 5 which takes with it the valves 23 and 26 and the associated parts, thus leaving the chamber 13 of the casing exposed to the pipe 7 through the cup-shaped strainer body 12.

When the desired amount of fluid has been transmitted through the pipe 7, the plug or closure unit 17 including the valves 23 and 26 is again returned to normal position as shown in Fig. 1 of the drawing. When in this position, if any excessive pressure should generate or prevail in the pipe 7, this pressure will operate to open the valve 23 and allow the same to escape into the chamber 13 and be discharged therefrom through the port or passage 19. On the other hand, if an excessive vacuum should be created in the pipe 7, the enlarged head 27 will be drawn inwardly to open the valve 26 against the action of the light spring 32 and the vacuum will be immediately released by virtue of the admission of air into the chamber 13 through the port 19 downwardly around the stem 30 of the valve 26 and thus into the pipe around the valve 26—27.

In installing a unit device of the kind described in connection with the vent pipes 7 of fuel storage tanks, it is not essential that the same be used as a filling means, but only as an auxiliary filling means, the device being primarily a plug or closure member having means automatically actuated to relieve excessive pressures and vacuums that may be created in a tank or vessel or a pipe leading therefrom.

Having fully described my invention, what I claim as new and desire to secure by Letters Patent, is:

1. A device of the class described comprising a closure plate, means thereon for detachably mounting the same in connection with a support, an openwork frame integral with said plate, a valve slidably engaging the frame, tensional means between the frame and valve for normally holding the valve in seated position, the valve being disposed below and in spaced relation to the lower surface of said closure plate to form a chamber between the valve and plate, a vent passage opening into said chamber above said valve, a supplemental valve slidably engaging the first named valve and seating therein, a passage formed through the first named valve to expose said chamber through the lower surface of the valves, said passage being controlled by said supplemental valve, tensional means for normally holding the supplemental valve seated, said first named valve comprising a large disk having a packing supported in the lower surface thereof, and said supplemental valve including a large disk-shaped head seated on said packing adjacent the peripheral edges thereof.

2. A device of the class described comprising a closure plate, means thereon for detachably mounting the same in connection with a support, an openwork frame integral with said plate, a valve slidably engaging the frame, tensional means between the frame and valve for normally holding the valve in seated position, the valve being disposed below and in spaced relation to the lower surface of said closure plate to form a chamber between the valve and plate, a supplemental valve slidably engaging the first named valve and seating therein, a passage formed through the first named valve to expose said chamber through the lower surface of the valves, said passage being controlled by said supplemental valve, tensional means for normally holding the supplemental valve seated, said first named valve comprising a large disk having a packing supported in the lower surface thereof, said supplemental valve including a large disk-shaped head seated on said packing adjacent the peripheral edges thereof, and adjustable means for supporting the supplemental valve in seated position.

3. In a filling cap and valve unit of the class described, a tubular casing, a closure plate detachably mounted in the upper end of the casing with the upper surface of said plate flush with the upper edge of said casing, said plate supporting within the casing a combination pressure and suction valve mechanism retained against accidental displacement from and movable with said plate, the upper surface of the plate having a countersunk tool key socket facilitating attachment and detachment of said plate with the casing, and a vent passage extending from the inner surface of the plate through the upper surface thereof at a point above said tool socket.

4. In a filling cap and valve unit of the class described, a tubular casing, a closure plate detachably mounted in the upper end of the casing with the upper surface of said plate flush with the upper edge of said casing, said plate supporting within the casing a combination pressure and suction valve mechanism retained against accidental displacement from and movable with said plate, the upper surface of the plate having a countersunk tool key socket facilitating attachment and detachment of said plate with the casing, a vent passage extending from the inner surface of the plate through the upper surface thereof at a point above said tool socket, means effecting a seal between said closure plate and casing, and said casing being provided in one side wall thereof above said combination valve with a threaded aperture.

5. In a closure and relief device for tanks and the like, the combination with a tubular casing of a valve unit attachable and detachable with respect to the casing to control admission to said tank through the casing, said unit comprising a closure plate arranged within the walls of one end of said casing and having an inwardly extending flange directly engaging the casing wall, an openwork frame extending from the inner end of said flange and provided centrally with a cylindrical bearing, a large disk-shaped valve substantially equal in diameter to the diameter of said flange and having a tubular stem slidably engaging said bearing, means for preventing accidental displacement of the valve from said bearing, the casing having inwardly of the other end thereof an inwardly projecting annular valve seat in connection with which said valve operates, and tensional means arranged on said stem between the bearing and valve proper for tensionally supporting a valve upon said seat when the closure plate is mounted in said casing.

6. In a closure and relief device for tanks and the like, the combination with a tubular casing of a valve unit attachable and detachable with respect to the casing to control admission to said tank through the casing, said unit comprising a closure plate arranged within the walls of one end of said casing and having an inwardly extending flange directly engaging the casing wall, an openwork frame extending from the inner end of said flange and provided centrally with a cylindrical bearing, a large disk-shaped valve substantially equal in diameter to the diameter of said flange and having a tubular stem slidably engaging said bearing, means for preventing accidental displacement of the valve from said bearing, the casing having inwardly of the other end thereof an inwardly projecting annular valve seat in connection with which said valve operates, tensional means arranged on said stem between the bearing and valve proper for tensionally supporting a valve upon said seat when the closure plate is mounted in said casing, the bore of the tubular stem of said valve opening outwardly through the lower surface of the valve to form a suction relief passage through said valve, and a supplemental valve adjustably supported in connection with the first named valve and controlling said suction passage.

7. In a closure and relief device for tanks and the like, the combination with a tubular casing of a valve unit attachable and detachable with respect to the casing to control admission to said tank through the casing, said unit comprising a closure plate arranged within the walls of one end of said casing and having an inwardly extending flange, an openwork frame extending from the inner end of said flange and provided centrally with a cylindrical bearing, a large disk-shaped valve having a tubular stem slidably engaging said bearing, means for preventing accidental displacement of the valve from said bearing, the casing having inwardly of the other end thereof an annular valve seat in connection with which said valve operates, tensional means arranged on said stem between the bearing and valve proper for tensionally supporting a valve upon said seat when the closure plate is mounted in said casing, the bore of the tubular stem of said valve opening outwardly through the lower surface of the valve to form a suction relief passage through said valve, a supplemental valve adjustably supported in connection with the first named valve and controlling said suction passage, and said first named valve having a contact facing of yieldable material and the supplemental valve having a large disk-shaped head seating on said valve facing.

8. In a closure and relief device for tanks and the like, the combination with a tubular casing of a valve unit attachable and detachable with respect to the casing to control admission to said tank through the casing, said unit comprising a closure plate arranged within the walls of one end of said casing and having an inwardly extending flange, an openwork frame extending from the inner end of said flange and provided centrally with a cylindrical bearing, a large disk-shaped valve having a tubular stem slidably engaging said bearing, means for preventing accidental displacement of the valve from said bearing, the casing having inwardly of the other end thereof an annular valve seat in connection with which said valve operates, tensional means arranged on said stem between the bearing and valve proper for tensionally supporting a valve upon said seat when the closure plate is mounted in said casing, the bore of the tubular stem of said valve opening outwardly through the lower surface of the valve to form a suction relief passage through said valve, a supplemental valve adjustably supported in connection with the first named valve and controlling said suction passage, said first named valve having a contact facing of yieldable material and the supplemental valve having a large disk-shaped head seating on said valve facing, said closure plate having a vent passage and one side wall of the casing intermediate the closure plate and valve seat having a threaded aperture opening into said casing.

9. A combination plug and a valve unit of the class described comprising a tubular casing open at both ends, an inwardly extending flange forming an annular valve seat dividing the casing into chambers above and below said seat, said chambers being of a diameter greater than the diameter of the passage through said seat, a closure plate detachably coupled with and arranged entirely within one end of the casing, means for coupling the other open end of the casing to a suitable support to provide a control unit therefor, said plate including an openwork part extending into the chamber of said casing above the valve seat, a disk-shaped valve movably mounted in connection with and retained against accidental displacement from said part, and tensional means between said valve and part for normally supporting the valve upon the valve seat to close the communication between the chambers of the casing.

10. A combination plug and a valve unit of the class described comprising a tubular casing open at both ends, an inwardly extending flange forming an annular valve seat dividing the casing into chambers above and below said seat, said chambers being of a diameter greater than the diameter of the passage through said seat, a closure plate detachably coupled with and arranged within one end of the casing, means for coupling the other open end of the casing to a suitable support to provide a control unit therefor, said plate including an openwork part extending into the chamber of said casing above the valve seat, a disk-shaped valve movably mounted in connection with and retained against accidental displacement from said part, tensional means between said valve and part for normally supporting the valve upon the valve seat to close the communication between the chambers of the casing, a suction relief passage extending centrally through said disk-shaped valve, and a supplemental valve adjustably supported on the first named valve and controlling said suction passage.

11. A combination plug and a valve unit of the class described comprising a tubular casing open at both ends, an inwardly extending flange forming an annular valve seat dividing the casing into chambers above and below said seat, said chambers being of a diameter greater than the diameter of the passage through said seat, a closure plate detachably coupled with and arranged within one end of the casing, means for coupling the other open end of the casing to a suitable support to provide a control unit therefor, said plate including an openwork part extending into the chamber of said casing above the valve seat, a disk-shaped valve movably mounted in connection with and retained against accidental displacement from said part, tensional means between said valve and part for normally supporting the valve upon the valve seat to close the communication between the chambers of the casing, said closure plate having a vent opening, a suction relief passage extending centrally through said disk-shaped valve, a supplemental valve adjustably supported on the first named valve and controlling said suction passage, said flange having a supplemental seat, and a large cup-shaped strainer body supported upon the supplemental seat and extending into the chamber of the casing below said seat.

ABRAHAM A. ARVINTZ.